United States Patent [19]
Coraor et al.

[11] 3,991,481
[45] Nov. 16, 1976

[54] PROCESS FOR RECOVERING VOLATILE ORGANIC LIQUIDS

[75] Inventors: George R. Coraor, Wilmington; Harold L. Jackson, Hockessin; Frederick W. Mader, Wilmington, all of Del.

[73] Assignee: E. I. Du Pont de Nemours and Company, Wilmington, Del.

[22] Filed: May 28, 1975

[21] Appl. No.: 581,570

[52] U.S. Cl. .................................. 34/28; 34/72; 34/73
[51] Int. Cl.² ................................ F26B 3/04
[58] Field of Search ............... 8/139, 149, 94 A; 34/73, 76, 77, 78, 79, 27, 32, 26

[56] References Cited
UNITED STATES PATENTS

| | | | |
|---|---|---|---|
| 2,267,718 | 12/1941 | Campbell et al. | 8/139 |
| 2,871,574 | 2/1959 | Thies | 34/104 |
| 3,408,748 | 11/1968 | Dunn, Jr. | 34/78 |
| 3,510,954 | 5/1970 | Dunn, Jr. | 34/78 |
| 3,542,506 | 11/1970 | Case et al. | 8/142 |
| 3,564,723 | 2/1971 | Passey et al. | 34/22 |
| 3,575,686 | 4/1971 | Case et al. | 8/142 |
| 3,836,474 | 9/1974 | Barton et al. | 8/142 |

*Primary Examiner*—John J. Camby
*Assistant Examiner*—Larry I. Schwartz

[57] ABSTRACT

Process for substantially quantitatively removing and recovering a volatile, organic, water-immiscible wetting liquid from a solid material which is wet therewith, which process comprises intimately contacting the solid material first with the superheated vapor of a water-immiscible, organic stripping liquid and thereafter with dry steam, said contacting taking place in an environment substantially free of noncondensable gas, condensing the mixture of organic vapor and steam to form a two-phase liquid mixture consisting of liquid organic phase and liquid water phase, and separating the liquid organic phase and the liquid water phase.

13 Claims, 3 Drawing Figures

PROCESS FOR RECOVERING VOLATILE ORGANIC LIQUIDS

BACKGROUND OF THE INVENTION

1. Field of the Invention

This invention relates to the recovery of volatile, organic, water-immiscible wetting liquids from solid materials containing same.

2. Description of the Prior Art

The recovery of volatile, organic, water-immiscible liquids which are employed in the processing of solid materials, for example, textiles, is of significant economic and ecologic importance. U.S. Pat. No. 3,542,506 dicloses the use of superheated steam, applied countercurrently, to remove halogenated hydrocarbon dry-cleaning solvent from a moving textile web. The solvent vapors and the steam are condensed and the solvent is separated from the water by conventional means, such as a water separator. U.S. Pat. Nos. 3,408,748 and 3,466,757 disclose a process for contacting a solvent wet solid with superheated stripping solvent vapor to remove the solvent from the solid. The stripping solvent can be the same as the solvent wetting the solid. The solvent or solvents can be recovered by conventional condensation techniques.

Prior art devices and processes may be wasteful of energy and of the wetting and stripping liquids employed. For example, the use of superheated steam to remove a high boiling solvent may be very inefficient. Similarly, the use of superheated organic liquids, instead of superheated steam, may be very inefficient and expensive if the organic liquid employed is not recovered from the object treated therewith.

DESCRIPTION OF THE INVENTION

Figure 1:
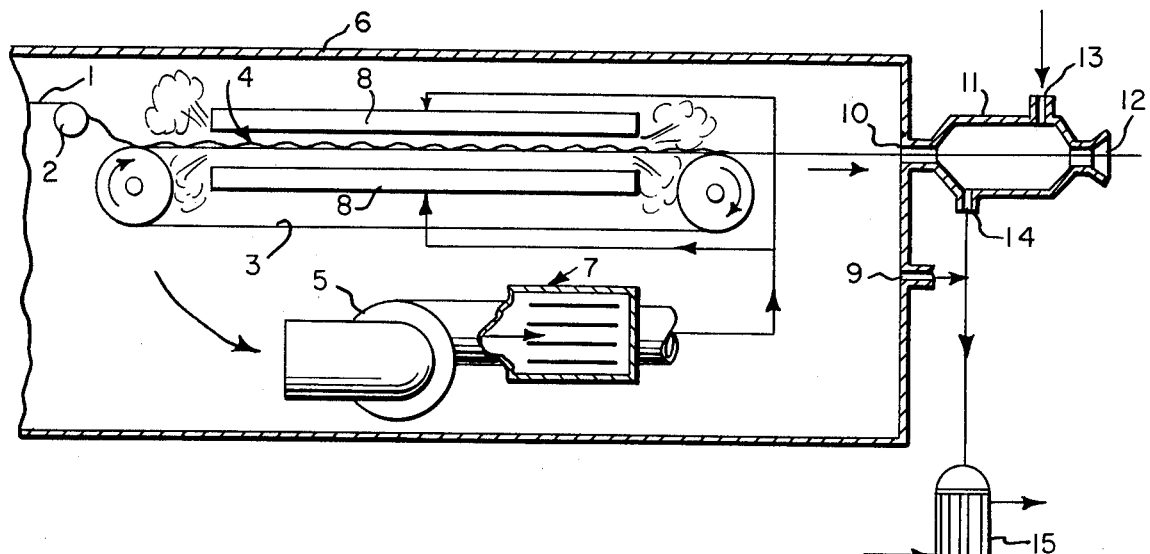
FIG. 1 shows an embodiment wherein a prior art process, not shown, such as solvent dyeing or scouring of a textile web, is carried out in conjunction with the invention process which takes place continuously within a housing.

It is an object of this invention to provide a process for substantially quantitatively removing and recovering a volatile, organic water-immiscible liquid, the wetting liquid, from a solid material which is wet therewith. It is a further object to provide such a removal and recovery process which can be carried out more economically than prior art processes.

The invention process comprises:

a. contacting the solid material which is wet with a volatile, organic, water-immiscible wetting liquid with vapor of a volatile, organic, water-immiscible stripping liquid to vaporize the wetting liquid, said stripping liquid vapor being at a temperature above the boiling point of the wetting liquid, preferably at least 5° C. above, and said contacting being carried out in the absence of a substantial amount of noncondensable gas, that is, gas, for example, air, which cannot be condensed under the conditions employed in (c);

b. displacing organic vapor on the solid material with dry steam which is at a temperature sufficient to avoid substantial condensation thereof on the solid material, for example, above 100° C. at atmospheric pressure;

c. condensing the mixture of displaced organic vapor and steam from (b) to produce a liquid, organic waterimmiscible phase and a liquid water phase;

d. separating the liquid organic phase and the liquid water phase;

e. recovering solid material which is substantially free of wetting liquid, stripping liquid and vapor of wetting liquid and stripping liquid. The separated liquid organic phase can be recycled. If desired and/or if necessary before recycling, the separated, liquid organic phase can be separated into its components if the wetting liquid and the stripping liquid are not the same.

In referring herein to liquid or vapor as being on the solid material, it is intended to include liquid or vapor which is in or within the solid material. Thus included is liquid or vapor which is absorbed or adsorbed or occluded by or on or in the solid material as well as liquid or vapor which is merely physically contained in or within the solid material, such as in cracks and indentations. In such context also are the terms "wet" and "wetting" to be construed. More specifically, the descriptions of the wetting liquid and the solid material which is wet therewith are intended to include any liquid which is employed in the processing of the solid material and which must be removed therefrom and recovered. By "water-immiscible" is meant having a solubility in water of less than 1 weight % at 25° C.

By the process of this invention, the wetting liquid can be removed from the solid material and recovered substantially quantitatively with relatively low expenditure of energy, as compared to prior art processes. The solid material which is recovered is substantially free of wetting liquid, stripping liquid and vaporized wetting liquid and stripping liquid. The amount of vaporized and/or liquid water on the recovered solid material is negligible and/or acceptable in the trade for such materials.

As already suggested, the invention relates to the processing of solid materials which are wet with a volatile, organic, water-immiscible wetting liquid which must be removed therefrom to yield a useful product and/or to recover expensive wetting liquid. Such solid materials include textile products comprising natural and synthetic fibers, for example, in package form, yarns, webs and fabrics, for example, woven, nonwoven and knitted natural and synthetic fibers, which may be wet by organic liquids during processing. Other solid materials from which processing liquids can be removed by this invention include rods, filaments, films or shaped articles of polyethylene, polypropylene, polystyrene, polyvinyl chloride and urea-formaldehyde and other synthetic plastics and resins. Still other solid materials which may be contacted with a wetting liquid which must be removed and recovered are various, shaped, metal and ceramic objects and products of natural origin, such as minerals, ores, wood and hair. Removal of wetting liquids from porous solid materials, other than wood, also can be effected by the invention process. The invention has particular utility in the processing of textiles, for example, in the removal of organic liquids after the application of dyes and/or textile finishes and after solvent scouring. It is to be understood, however, that this discussion is not intended to be limiting, since the process of the invention is broadly applicable to a wide variety of solid materials.

The invention process comprises, in the first step, contacting the solid material, wet with the organic wetting liquid, with the superheated vapor of a volatile, organic, water-immiscible stripping liquid. The stripping liquid and the wetting liquid can be the same or different. If different in composition from the wetting liquid, the superheated vapor of the stripping liquid should be substantially nonreactive with the wetting liquid and it should be inert to the solid material. The contacting of the wet solid material with the superheated vapor is done with the vapor temperature being above, preferably at least 5° C. above, most preferably at least 50° C. above, the boiling temperature of the wetting liquid and in the absence of a substantial amount of a permanent or noncondensable gas, such as air. Should air or other noncondensable gas be present, recovery efficiency of the organic liquid is reduced. Following vaporization and removal of the wetting liquid from the solid material, the stripping liquid vapor values remaining on the solid material, for example, adsorbed on the surfaces or occluded in interstices of the material, are removed by displacing with dry steam. The mixture of stripping liquid vapor and steam is condensed in another zone to form a liquid organic phase and a water phase, from which the organic phase is separated and returned for reuse.

The wetting liquid can be any volatile organic liquid which is useful in processing the solid material. It should be inert and nonreactive toward the stripping liquid. It is much preferred that the wetting liquid and stripping liquid be the same composition since a separation step is thereby avoided.

Organic water-immiscible liquids boiling above about 20° C. and which can yield superheated vapors which are stable above the boiling temperature of the wetting liquid are suitable as stripping liquids. For operational safety, it is desirable that the stripping liquids be nonflammable. For energy conservation, the stripping liquid should possess a specific heat less than about 0.6 cal./gram/° C. at about 25° C. and a latent heat of vaporization below about 100 cal./gram. Preferably the specific heat should be less than about 0.3 cal./gram/° C. at about 25° C. and the latent heat should be less than about 50 cal./gram. Liquid fluoro, chloro and chlorofluoro substituted and unsubstituted aliphatic and cycloaliphatic hydrocarbons and aliphatic and cycloaliphatic fluoroethers and fluoro-tert-amines are suitable as stripping liquids. However, the fluorine-containing compounds are preferred since they are nonflammable and they are insoluble in most solid materials. The unsubstituted hydrocarbons are generally flammable and the chloro substituted compounds are imbibed by certain materials, for example, polyester textiles, and may be difficult to recover. The fluorine-containing compounds are favored because their low specific heats and latent heats minimize energy requirements. Fluorine-containing compounds which are suitable as stripping liquids include perfluorodimethylcylohexane, perfluorodimethylcyclobutane, perfluorohexane, perfluoro(N-propylmorpholine), perfluoro(2-butyltetrahydrofuran), perfluoro(2-propyltetrahydropyran), hexafluoropropylene oxides of the formulas $F[CF(CF_3)CF_2O]_n$-$CHFCF_3$ and $F[CF(CF_3)CF_2O]_nCF_2CF_3$, wherein $n$ is 1–6, preferably 3–5, and perfluoro(tributylamine). Other suitable fluorine containing compounds are the chlorofluorocarbons, for example, trichlorofluoromethane, 1,1,2-trichloroperfluorocyclobutane, 2,2- and 2,3-dichloroperfluoropropane and 2,3-dichloroperfluorobutane. Trichlorofluoromethane and 1,1,2-trichloro1,2,2-trifluoroethane are preferred.

In the third step of the process, the residual vapor values from the liquids used are recovered by displacement from the dried solid material with dry steam at a temperature sufficient to prevent condensation on the solid material. If, as is preferable, the temperature of the solid material is above the boiling point of water at the prevailing pressure, the steam need be only free of liquid water, in which event the sensible heat of the solid material will prevent condensation as the steam displaces the vapor values. If the temperature of the solid material is below the boiling point of water at the prevailing pressure, sufficient heat must be supplied by the superheat of the steam to exceed that temperature.

Figure 2:
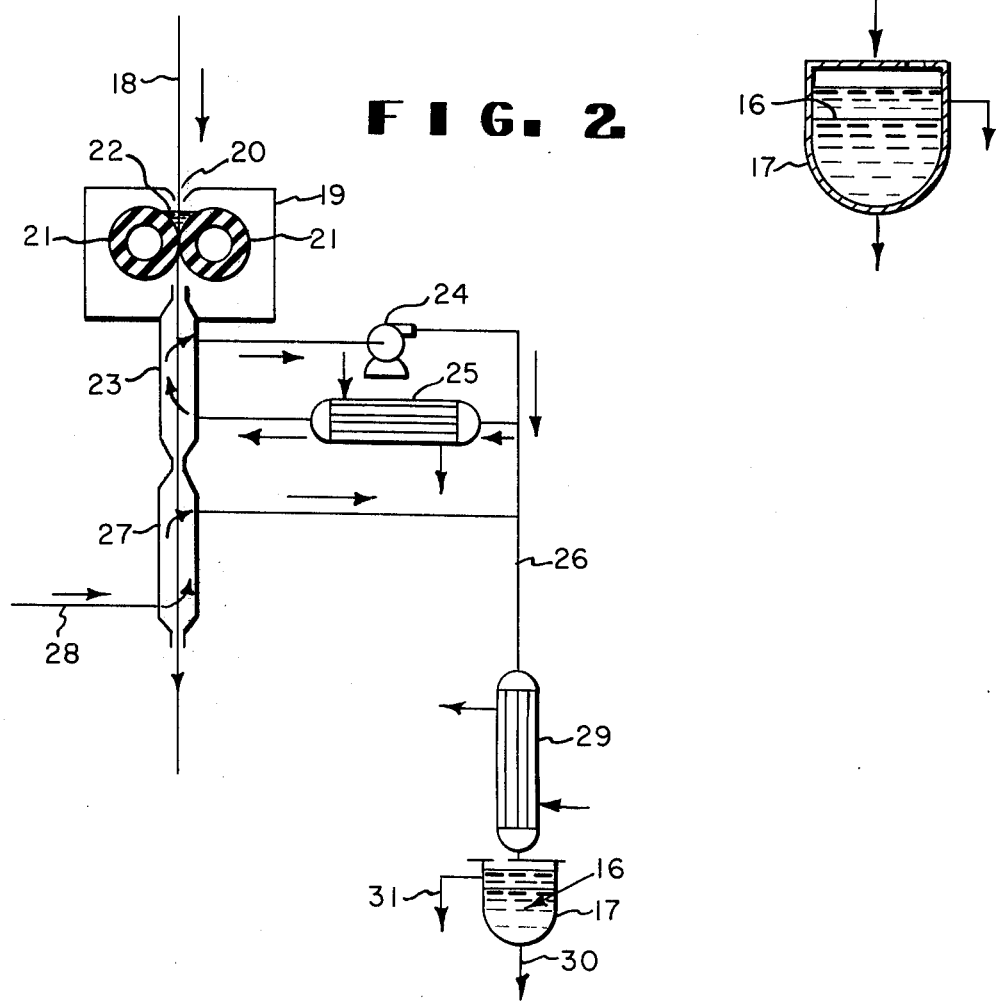
FIG. 2 shows the process of the invention applied in a continuous manner to a textile web which has been subjected to a solvent padding operation.
Figure 3:
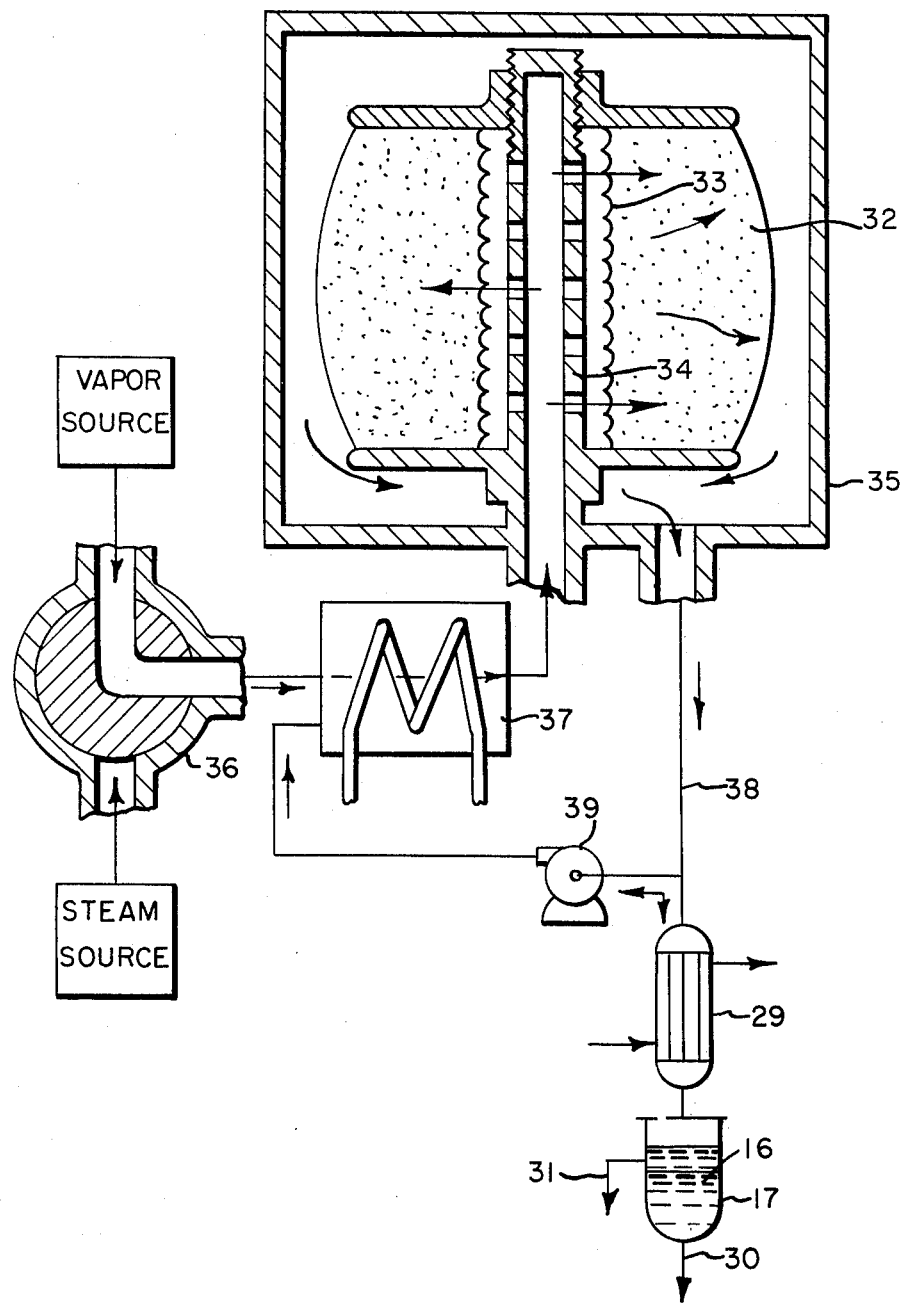
FIG. 3 shows the process of the invention applied in the batchwise removal of a liquid organic solvent from a yarn package.

In preferred embodiments of the invention, such as illustrated by FIGS. 1–3, the superheated vapor of the stripping liquid is recycled around a loop which includes a superheater, a pump and the solid material. A vent from this loop allows excess vapor, which may include vapors of both the wetting and stripping liquids, to be returned to appropriate liquid storage containers via a condenser and appropriate separation means.

In a process such as illustrated by FIG. 1 and conducted in a continuous manner, a volatile, organic waterimmiscible liquid wetting a textile web can be recovered. In this embodiment, web 1 which may be wet with a volatile, organic water-immiscible liquid as a result of having been subjected to a textile treating process, for example, solvent scouring, passes over sprocket 2 onto foraminous transport belt 3 at a rate slightly greater than the rate at which belt 3 transports it to ensure that the web passes in tension-free condition through superheated vapor zone 4. This precaution is sometimes taken because some webs, such as knitted goods, become distorted when heated under tension. Other means of web transport are also operable. Superheated organic vapor is brought into intimate contact with web 1 in superheated vapor zone 4 by blower 5 which circulates the organic vapor atmosphere within enclosure 6 and forces it through superheater 7 and thence through distributors 8 into superheated vapor zone 4. The atmosphere within enclosure 6 thus consists essentially of organic vapor and possibly a small amount of steam; at steady state, it is substantially free of permanent or noncondensable gas, such as air. The superheat of the vapor evaporates the liquid wetting web 1. The vapor generated in this manner joins the vapor within enclosure 6. Excess vapor passes out of enclosure 6 through conduit 9. Web 1, free of any substantial amount of liquid, passes out of superheated vapor zone 4 and of enclosure 6 through passage 10 into steam seal 11, thence through passage 12 to the atmosphere. In steam seal 11, web 1 meets a stream of dry steam, preferably a countercurrent stream, which enters steam seal 11 through inlet 13. The steam, being sufficiently heated that it does not grossly condense on web 1, is directed into intimate contact with web 1 to sweep entrained organic vapor from the interstices. The construction of the web permitting, it is preferred to pass the steam completely through the web. The mixture of steam and vapor leaves steam seal 11 through exit 14, joins the stream of conduit 9 and, in admixture with this stream, enters condenser 15 wherein vapor and steam condense to form a two-phase (water-organic) liquid mixture 16 which collects in separator 17. At least the organic phase is recovered for reuse by conventional means. The flow of steam in steam seal 11 and the size and nature of passages 10 and 12 are so regulated as to prevent loss of vapor through passage 12. The stream of steam entering through inlet 13 passes out of steam seal 11 mainly through exit 14. Ideally, no steam escapes through passages 10 and 12. However, it is preferred to allow some steam to pass through both passages rather than to allow air to become mixed with the stream reaching condenser 15 since the presence of air in this stream leads to substantial vapor losses because of reduced efficiency of condensation. For maximum efficiency of stripping liquid removal, it is preferred to apply steam to the web in isolated stages, for example, from a series of dispensers, so that fresh downstream steam will not be admixed with upstream steam already containing stripping liquid vapor.

The energy investment in this process consists of, at steady state, only the energy needed to superheat stripping liquid vapor to a degree corresponding to the heat of vaporization of the organic liquid wetting the textile web and the energy needed to provide superheated steam in a volume sufficient to sweep organic vapors from the web. If the web being treated in the invention process also contains water, generally in a small amount, then the water is also evaporated and removed from the web.

The processes and principles illustrated above are applicable to other processes, such as the drying of a textile web following solvent padding. Such a process is shown in FIG. 2. In the process illustrated by FIG. 2, dry textile web 18 enters padding enclosure 19 through entrance slot 20 and passes between rubber covered padder rolls 21 to which is provided pad liquor 22 containing a volatile, organic water-immiscible liquid. Thereafter, the wet padded web passes through a restriction into a first contact zone 23 wherein the web encounters a countercurrent stream of superheated vapor of either the same liquid as contained in the pad liquor 22 or another stripping liquid, at a temperature and in an amount sufficient to evaporate substantially all of the liquid on the web. Superheated vapor is provided to first contact zone 23 in a loop comprising blower 24 and superheater 25. Organic vapor in an amount equivalent to the organic liquid evaporated from the web is removed from the loop via line 26. The web then passes through a constriction into second contact zone 27 wherein the web encounters a countercurrent stream of dry steam at a temperature and in an amount sufficient to displace substantially all of the organic vapors on and in the interstices of the web. Dry steam is provided to second contact zone 27 via line 28 from a source not shown. Mixed organic vapors and steam join the stream of line 26 which passes into condenser 29 wherein organic vapors and steam condense to form a twophase (water-organic) liquid mixture 16 which collects in separator 17. When the organic phase is more dense than water, as in the preferred embodiment, it is recovered, as stream 30, for reuse. Water, as stream 31, generally may be discarded. The web leaves second contact zone 27 substantially free of organic vapors. The interstices of the web contain dry steam which, after condensation, brings the water content of the web to about its normal moisture regain value. Pressures and flows are so regulated in contact zones 23 and 27 as to minimize losses. For example, it is normally preferred to provide sufficient flow of superheated steam to second contact zone 27 to sweep all organic vapors in the countercurrent direction, even at the risk of losing steam at the web exit of zone 27. If excessive amounts of vapors or steam accumulate in padding enclosure 19, they may be removed for recovery via line 26 by conduit means not shown.

The invention process is especially useful for drying organic liquid-padded webs. In such padding operations, migration, for example, of dissolved or dispersed dye or textile assistant, during drying, may cause problems. Conventional means for overcoming migration often comprise adding gums or thickeners to the pad liquor to immobilize the migrating material. However, such incorporation negates an important advantage of organic liquid processing because water washing is normally needed to remove the gums or thickeners after fixing and the wash water must be disposed of in an ecologically acceptable manner. In the invention process, it is usually possible to evaporate the liquid of the pad liquor so rapidly that migration is minimized and gums or thickeners are not needed.

FIG. 3 illustrates a batch embodiment of the invention, namely, the drying of a yarn package which is wet with a volatile, organic water-immiscible liquid. A yarn package 32 wound on a compressible spring core 33 is mounted, preferably somewhat compressed, in the art-customary manner on hollow spindle 34 in housing 35. Although FIG. 3 shows a single package being dried, it is to be understood that a plurality of packages on a plurality of hollow spindles within the same housing can be dried by employing obvious modifications. In the first step, vapor of either the same liquid as that wetting package 32 or another stripping liquid provided from a source not shown enters selector valve 36 which is arranged to direct the vapor into superheater 37. The superheated vapor passes into hollow spindle 34, thence through the holes therein, through spring core 33 and thereafter through the interstitial spaces of the yarn package. Vapor leaves housing 35 via line 38. A portion of the stream is recycled by means of pump 39 to superheater 37 and package 32. The superheated vapor is recycled in this manner at a temperature and for a time sufficient to evaporate substantially all of the volatile water-immiscible liquid in the package. In the second step, selector valve 36 is turned so as to admit steam to the package via the superheater and pump 39 is shut off to prevent steam recycle. Dry steam is passed through the package for a time and at a temperature such that substantially all of the volatile, organic liquid vapors in the package are displaced and no substantial amount of steam condenses in the package. Thereafter, the steam is shut off and the substantially dry package is recovered from housing 35.

In the first step, organic vapors in an amount corresponding to the liquid evaporated in package 32 and, in the second step, the vapor in the package and the housing and steam are directed into condenser 29 wherein they condense to form a two-phase (water-organic) liquid mixture 16 which collects in separator 17. When the organic phase is more dense than water, as in the preferred embodiment, it is recovered, as stream 30, for reuse. Water, as stream 31, generally may be discarded.

The batch process described above is especially useful for drying a package which has been previously subjected to, in the same housing and without removal therefrom, solvent scouring and/or dyeing. In the embodiment illustrated by the figures, it may be preferred to condense substantially organic vapor-containing streams (for example, from 9 in FIG. 1) separately from streams containing substantial amounts of steam (for example, from 14 in FIG. 1).

The invention is further illustrated by the following examples.

EXAMPLE 1

A package of 0.37 kg. of polyester textured yarn, 150 denier, wound on a spring, was compressed 41.2% between two solid end plates and mounted in an apparatus similar to that shown in FIG. 3. The package was scoured with liquid 1,1,2-trichloro-1,2,2-trifluoroethane at about 25° C. by pumping the liquid from the inside to the outside of the package. Liquid flow was stopped and superheated 1,1,2-trichloro-1,2,2-trifluoroethane vapor at 140° C. was then passed from the inside to the outside of the package at a vapor rate of 1.7 kg./min. Within 20 seconds, all liquid was blown from the package. During the next 65 seconds, the 1,1,2-trichloro-1,2,2-trifluoroethane was vaporized from the yarn package, as shown by the substantially constant temperature of the exit gas (during vaporization), followed by a sharp increase in exit gas temperature to about 130° C. (after vaporization was complete). The superheated vapor flow was stopped and dry steam at about 135° C. was passed through the package from the inside to the outside for 10 seconds at 0.45 kg./min. The package was then removed; it was dry, odorless and completely free of any liquid. All of the 1,1,2-trichloro-1,2,2-trifluoroethane removed during the superheated vapor treatment can be recovered by condensation by taking off the vapor through a pressure control valve on the superheated vapor recycle loop. 1,1,2-Trichloro-1,2,2-trifluoroethane removed by the superheated steam can be recovered by condensation of the steam-organic vapor mixture, collection of the condensate in a water separator and separation of the 1,1,2-trichloro-1,2,2-trifluoroethane phase and the water phase.

EXAMPLE 2

This is an example of a continuous process wherein the wetting liquid and stripping liquid differ in composition. A .15 cm.-wide length of textured yarn, double-knit polyester fabric (0.41 kg./m.$^2$) was passed at 2.7 m./min. through a dispersion of 3-[N-methyl-p-(p-nitrophenylazo)anilino]propionitrile, a disperse dye, in 1,1,2-trichloro1,2,2-trifluoroethane. The wet padded fabric was then passed into an enclosure supplied with the superheated vapor (208° C.) of a polyhexafluoropropylene oxide of the formula F(CF(CF$_3$)CF$_2$O)$_4$CFHCF$_3$ (b.p. 193° C.); the dye was fixed during this treatment. The vaporized 1,1,2-trichloro-1,2,2-trifluoroethane was recovered by condensation. Residence time of the fabric in the superheated vapor was about 30 seconds. The fabric, substantially free of 1,1,2-trichloro-1,2,2-trifluoroethane but containing vapor of the polyhexafluoropropylene oxide, was then passed directly through an enclosure where it was contacted with dry superheated steam, flowing at about 0.45 kg./min. for 20 secondsm at about 150° C. and atmospheric pressure. The fabric emerged dry to the touch and substantially free of liquid. The polyhexafluoropropylene oxide vapor removed from the fabric and the steam were condensed, the condensate was collected in a water separator and the lower organic layer was returned to the superheated vapor enclosure for reuse.

Although the invention has been exemplified with examples of the recovery of liquids from textile materials, obvious modifications of the exemplified processes permit their application to the recovery of liquids from other solid materials. For example, in addition to those materials already discussed previously, liquids can be recovered by this process for particulates which include such diverse materials as electronic parts and coal. It is obvious to one skilled in the art that the exemplified continuous process can be modified so as to carry particulates on a transport belt, as suggested by the process of FIG. 1. Similarly, particulates can be treated in a batch process analogous to the process of FIG. 3.

We claim:

1. Energy saving process for substantially quantitatively removing and recovering a volatile, organic, water-immiscible wetting liquid from a solid material which is wet therewith, which process comprises:
    a. contacting the wet solid material with superheated vapor of a volatile, organic, water immiscible stripping liquid to vaporize the wetting liquid and produce a mixture comprising superheated stripping liquid vapor and wetting liquid vapor, said stripping liquid having a specific heat less than about 0.6 calorie/gram/° C. at about 250° C. and a latent heat of vaporization less than about 100 calories/gram, said stripping liquid vapor being at a temperature above the boiling point of the wetting liquid and said contacting being carried out in the absence of a substantial amount of gas which cannot be condensed in (d); and thereafter
    b. contacting the wet solid material with the vapor mixture produced in (a), while maintaining constant in the system the amount of superheated vapor of stripping liquid, until the solid material is substantially free of wetting liquid and contains organic vapor on its surfaces and/or occluded in its interstices, said maintaining of the amount of superheated vapor of stripping liquid being effected by removing organic vapor in an amount equivalent to the organic liquid vaporized from the wet solid material in (a) and in this step;
    c. displacing the solid-containing organic vapor of (b) with dry steam, which is at a temperature sufficient to avoid substantial condensation thereof on the solid material, to produce a mixture of organic vapor and steam;
    d. condensing the mixture of organic vapor and steam from (c) to produce a liquid, organic water-immiscible phase and a liquid water phase, and thereafter separating the two phases; and
    e. recovering solid material which is substantially free of wetting liquid, stripping liquid and vapor of wetting liquid and stripping liquid.

2. Process of claim 1 wherein the wetting liquid and the stripping liquid are the same.

3. Process of claim 2 wherein the liquid is trichlorofluoromethane or 1,1,2-trichloro-1,2,2-trifluoroethane.

4. Process of claim 1 wherein the stripping liquid vapor in (a) is at a temperature at least 5° C. above the boiling point of the wetting liquid.

5. Process of claim 1 wherein the stripping liquid has a specific heat less than about 0.3 calorie/gram/° C. at about 25° C. and a latent heat of vaporization less than about 50 calories/gram.

6. Process of claim 1 carried out as a batch process.

7. Process of claim 1 carried out continuously.

8. Process of claim 1 wherein the solid material is a textile product.

9. Process of claim 8 wherein the textile product is a yarn of synthetic or natural fibers in package form.

10. Process of claim 8 wherein the textile product is a web of woven, nonwoven or knitted natural or synthetic fiber.

11. Process of claim 1 wherein the stripping liquid is $F[CF(CF_3)CF_2O]_nCHFCF_3$ wherein $n$ is 3–5.

12. Process of claim 4 wherein the temperature is at least 50° C. above the boiling point of the wetting liquid.

13. Process of claim 5 wherein the stripping liquid is a fluorine-containing compound selected from fluoro and chlorofluoro substituted aliphatic and cycloaliphatic hydrocarbons and aliphatic and cycloaliphatic fluoroethers and fluoro-tert-amines.

* * * * *

UNITED STATES PATENT OFFICE
CERTIFICATE OF CORRECTION

PATENT NO. : 3,991,481
DATED : November 16, 1976
INVENTOR(S) : George R. Coraor, Harold L. Jackson and Frederick W. Mader It is certified that error appears in the above-identified patent and that said Letters Patent are hereby corrected as shown below:

Column 7, line 54, the formula should read
--$F(CF(CF_3)CF_2O)_4CFHCF_3$ --; line 63, "secondsm" should read
-- seconds --. Column 8, line 28, "250°C" should read
-- 25°C --.

Signed and Sealed this

Thirteenth Day of December 1977

[SEAL]

Attest:

RUTH C. MASON
Attesting Officer

LUTRELLE F. PARKER
Acting Commissioner of Patents and Trademarks